(12) United States Patent
Kim et al.

(10) Patent No.: US 10,753,100 B2
(45) Date of Patent: Aug. 25, 2020

(54) FLOORING PANEL EQUIPPED WITH QUICK-RELEASE ADHESIVE SHEET

(71) Applicant: Ecointeriors Corp., Mineola, NY (US)

(72) Inventors: David J. Kim, Garden City, NJ (US); Chi-Jung Lin, Licheng Town (CN)

(73) Assignee: Ecointeriors Corp., Mineola, NY (US)

( * ) Notice: Subject to any disclaimer, the term of this patent is extended or adjusted under 35 U.S.C. 154(b) by 0 days.

(21) Appl. No.: 15/933,315

(22) Filed: Mar. 22, 2018

(65) Prior Publication Data

US 2019/0048593 A1 Feb. 14, 2019

Related U.S. Application Data

(60) Provisional application No. 62/574,951, filed on Oct. 20, 2017, provisional application No. 62/544,664, filed on Aug. 11, 2017.

(51) Int. Cl.
*E04F 13/08* (2006.01)
*E04F 15/10* (2006.01)
(Continued)

(52) U.S. Cl.
CPC ............ *E04F 13/0885* (2013.01); *B32B 5/18* (2013.01); *B32B 7/12* (2013.01); *B32B 27/065* (2013.01); *B32B 27/306* (2013.01); *B32B 27/32* (2013.01); *B32B 27/40* (2013.01); *E04F 13/0866* (2013.01); *E04F 15/0215* (2013.01);
(Continued)

(58) Field of Classification Search
CPC .... E04F 13/0885; E04F 13/0866; B32B 7/12; B32B 5/18; B32B 27/065; B32B 27/306; B32B 27/32; B32B 27/40; B32B 2266/0221; B32B 2471/00; B32B 2266/0278; B32B 2266/025; B32B 2266/06
See application file for complete search history.

(56) References Cited

U.S. PATENT DOCUMENTS 3,657,852 A 4/1972 Worthington
4,018,025 A 4/1977 Collette
(Continued)

FOREIGN PATENT DOCUMENTS

DE 02015105847 U1 12/2015
JP 08302978 A 11/1996
(Continued)

OTHER PUBLICATIONS

International Search Report and Written Opinion of the International Searching Authority in Application No. PCT/US2018/046247 dated Dec. 3, 2018.
(Continued)

*Primary Examiner* — Nathan L Van Sell
(74) *Attorney, Agent, or Firm* — John K. Kim; Ralph W. Selitto

(57) ABSTRACT

A flooring panel is provided with a quick-release adhesive sheet such that the flooring panel can be quickly attached to a support surface and removed therefrom. More particularly, the flooring panel includes a top floor layer attached or laminated to the adhesive sheet, which underlies the floor layer. The top flooring layer can be any type of flooring material, such as vinyl flooring, real or engineered wood flooring, etc.

17 Claims, 4 Drawing Sheets

(51) Int. Cl.

| | | |
|---|---|---|
| *E04F 15/02* | (2006.01) | |
| *B32B 5/18* | (2006.01) | |
| *B32B 7/12* | (2006.01) | |
| *B32B 27/06* | (2006.01) | |
| *B32B 27/30* | (2006.01) | |
| *B32B 27/32* | (2006.01) | |
| *B32B 27/40* | (2006.01) | |

(52) U.S. Cl.
CPC ...... *E04F 15/02133* (2013.01); *E04F 15/107* (2013.01); *B32B 2266/025* (2013.01); *B32B 2266/0221* (2013.01); *B32B 2266/0278* (2013.01); *B32B 2266/06* (2013.01); *B32B 2471/00* (2013.01)

(56) References Cited

U.S. PATENT DOCUMENTS

| | | | |
|---|---|---|---|
| 4,089,999 | A | 5/1978 | Mondt |
| 4,287,693 | A | 9/1981 | Collette |
| 5,863,630 | A | 1/1999 | Maruta et al. |
| 5,950,378 | A | 9/1999 | Council |
| 6,057,041 | A | 5/2000 | Sumi |
| 6,167,879 | B1 | 1/2001 | Sievers et al. |
| 6,343,451 | B1 | 2/2002 | Chih |
| 6,434,897 | B1 | 8/2002 | Sievers et al. |
| 6,451,441 | B1 | 9/2002 | Nishimoto |
| 6,526,705 | B1 | 3/2003 | MacDonald |
| 7,641,946 | B2 | 1/2010 | Kanamaru |
| 7,799,157 | B2 | 9/2010 | Kato et al. |
| 7,985,123 | B2 | 7/2011 | Yamada |
| 8,231,955 | B2 | 7/2012 | Rolf et al. |
| 8,343,611 | B2 | 1/2013 | Tobita et al. |
| 8,640,824 | B2 | 2/2014 | Freedman et al. |
| 8,806,831 | B1 | 8/2014 | Dreyer |
| 9,603,419 | B2 | 3/2017 | Crosby et al. |
| 2003/0131549 | A1 | 7/2003 | Kappeli |
| 2004/0037992 | A1 | 2/2004 | Hrovath |
| 2004/0237446 | A1 | 12/2004 | Precey |
| 2006/0127647 | A1 | 6/2006 | Thrush |
| 2006/0156663 | A1 | 7/2006 | Mao |
| 2007/0199257 | A1 | 8/2007 | Thrush |
| 2007/0218269 | A1 | 9/2007 | Kato et al. |
| 2009/0031658 | A1 | 2/2009 | Moller, Jr. |
| 2010/0173111 | A1 | 7/2010 | Yamada |
| 2010/0313510 | A1 | 12/2010 | Tang |
| 2011/0120037 | A1 | 5/2011 | Barlow |
| 2011/0179734 | A1 | 7/2011 | Shaffer |
| 2011/0250434 | A1 | 10/2011 | Schauer |
| 2012/0009377 | A1 | 1/2012 | Dodge, III |
| 2012/0117909 | A1 | 5/2012 | Reichwein |
| 2012/0225773 | A1* | 9/2012 | Krueger ................ A61L 15/225 502/402 |
| 2012/0276297 | A1 | 11/2012 | Cypcar et al. |
| 2013/0071625 | A1 | 3/2013 | Masanek, Jr. |
| 2013/0139463 | A1 | 6/2013 | DeLong |
| 2013/0139464 | A1 | 6/2013 | DeLong |
| 2013/0143012 | A1 | 6/2013 | Wu |
| 2013/0160639 | A1 | 6/2013 | Lee |
| 2013/0167458 | A1 | 7/2013 | Cerny |
| 2013/0291457 | A1 | 11/2013 | Tillery |
| 2013/0291474 | A1 | 11/2013 | Tillery |
| 2013/0326989 | A1 | 12/2013 | Hartert |
| 2014/0057076 | A1 | 2/2014 | Delia Pepa |
| 2014/0227484 | A1 | 8/2014 | Sung |
| 2015/0056405 | A1 | 2/2015 | Kim |
| 2015/0056422 | A1 | 2/2015 | Bastin |
| 2015/0075092 | A1 | 3/2015 | Moller, Jr. |
| 2015/0233128 | A1 | 8/2015 | Schauer |
| 2015/0284965 | A1 | 10/2015 | Hurson |
| 2015/0361675 | A1 | 12/2015 | Cerny |
| 2015/0376904 | A1 | 12/2015 | Huss |
| 2016/0032597 | A1* | 2/2016 | Keane ................... E04F 15/166 52/309.9 |
| 2016/0326750 | A1 | 11/2016 | Lin |

FOREIGN PATENT DOCUMENTS

| | | |
|---|---|---|
| JP | 2000052464 A | 2/2000 |
| JP | 2003056167 | 2/2003 |
| JP | 2007224548 A | 9/2007 |
| WO | 01/44562 A2 | 6/2001 |
| WO | 2006/076487 A2 | 7/2006 |
| WO | 2013/042807 A1 | 3/2013 |

OTHER PUBLICATIONS

Notification Concerning Transmittal of International Preliminary Report on Patentability and International Preliminary Report on Patentability dated Feb. 20, 2020 in PCT/US2018/046247. (10 pages).

* cited by examiner

FLOORING PANEL EQUIPPED WITH QUICK-RELEASE ADHESIVE SHEET

CROSS-REFERENCE TO RELATED APPLICATIONS

The present application claims priority to U.S. Provisional Application No. 62/574,951, filed Oct. 20, 2017 and entitled FLOORING PANEL EQUIPPED WITH QUICK-RELEASE ADHESIVE SHEET, and U.S. Provisional Application No. 62/544,664, filed Aug. 11, 2017 and entitled NOVEL ADHESIVE SHEETS AND PANELS EQUIPPED WITH SAME, the disclosures of which provisional applications are incorporated herein by reference in their entireties.

FIELD OF THE INVENTION

The present invention relates to a flooring panel equipped with a quick-release adhesive sheet.

BACKGROUND OF THE INVENTION

Flooring panels are used to form a floor over a support surface, such as a sub-floor. Such panels are made from a variety of materials (e.g., vinyl, wood, etc.). Various methods have been used for attaching flooring panels to support surfaces.

SUMMARY OF THE INVENTION

In accordance with one embodiment, the present invention provides a flooring panel having a quick-release adhesive sheet such that the flooring panel can be quickly attached to a support surface and removed therefrom. More particularly, the flooring panel includes a top floor layer attached or laminated to the adhesive sheet, which underlies the floor layer. The top flooring layer can be any type of flooring material, such as vinyl flooring, real or engineered wood flooring, etc.

In one embodiment, the elastic layer includes a plurality of suction holes formed in a first side of the elastic layer. The first side of the elastic layer is coated with a sealing material for releasably sealing the holes against a support surface, such as a sub-floor. In one embodiment, the adhesive sheet includes a primer coating, which is applied to a second opposite side of the elastic layer, and a bonding layer applied to the primer coating, for attaching the floor layer to the adhesive sheet. A protective film is optionally attached over the first side of the elastic layer to protect the coating of sealing material, as well as the suction holes.

In other embodiments, the adhesive sheet may be used as a stand-alone product for removably attaching a pre-fabricated construction or decorative plates, such as a flooring or wall panel, to a support surface. In another embodiment, the adhesive sheet is laminated to other items, such as pre-fabricated construction or decorative plates (e.g., a wall panel), so as to form a composite, laminated panel.

In one embodiment, a flooring panel includes an upper floor layer having an upper side and a lower side. The flooring panel also includes an elastic layer having an upper side, which is attached to the lower side of the upper floor layer, and a lower side, which is located opposite the upper side of the elastic layer and which defines a lower surface of the elastic layer. The elastic layer is made from a foam material and includes a plurality of open holes formed in the lower side of the elastic layer. The open holes are sized and shaped for applying suction against a support surface when the flooring panel is applied thereto. A sealing material is applied to the substantially entire surface of the lower side of the elastic layer for enhancing the suction applied by the holes to the support surface. In one embodiment, at least some of the holes retain hollow spaces therein so as to apply the suction to the support surface. In one embodiment, the sealing material does not completely fill the at least some of the holes so as to maintain the hollow spaces. In one embodiment, the sealing material is configured to form a substantially air-tight seal around outer edges of the at least some of the holes when the flooring panel is applied against the support surface. In one embodiment, the sealing material includes polyurethane.

BRIEF DESCRIPTION OF THE DRAWINGS

In the drawing figures, which are not to scale, and where like reference numerals indicate like elements throughout the several views.

DESCRIPTION OF EMBODIMENTS OF THE INVENTION

Figure 1:
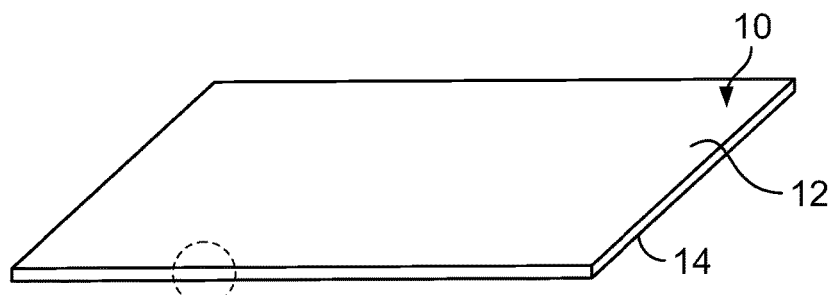
FIG. 1 is a perspective view of an adhesive sheet in accordance with an embodiment of the present invention.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, and some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; exemplary embodiments are provided merely to be illustrative. Among other things, for example, subject matter may be embodied as methods, devices, components, or systems. The following detailed description is, therefore, not intended to be taken in a limiting sense.

Throughout the specification and/or claims, terms may have nuanced meanings suggested or implied in context beyond an explicitly stated meaning. Likewise, the phrase "in one embodiment" as used herein does not necessarily refer to the same embodiment and the phrases "in another embodiment" and "other embodiments" as used herein do not necessarily refer to a different embodiment. It is intended, for example, that covered or claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
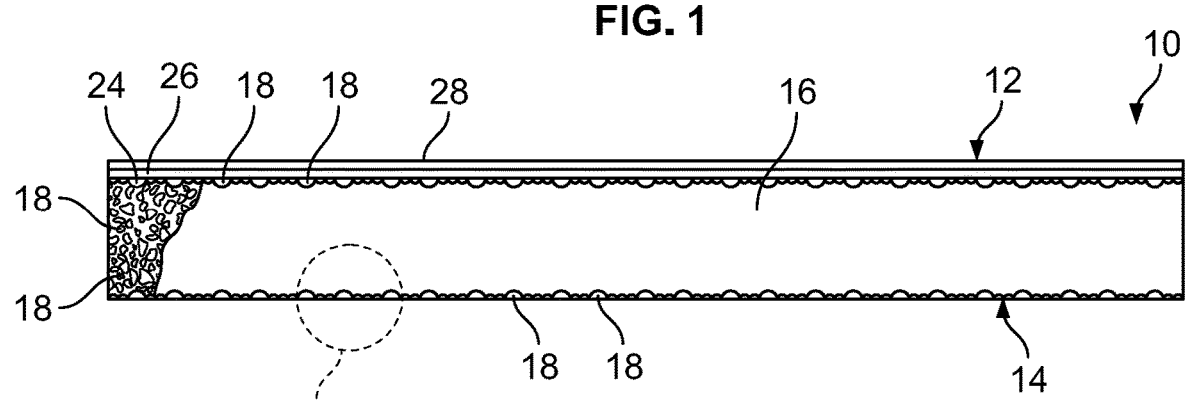
FIG. 2 is a partial cross-sectional view of a portion of the adhesive sheet shown in FIG. 1.

FIGS. 1 and 2 illustrate an adhesive or suction sheet 10 constructed in accordance with an embodiment of the present invention. The adhesive sheet 10 is adapted to be releasably attached to a support surface (e.g., any non-porous, substantially flat surface). The adhesive sheet 10 has a bonding side 12 adapted to be attached to an item (not show in FIGS. 1 and 2), such as a flooring or wall panel, so that the item can be releasably attached to the support surface via the adhesive sheet 10. An adhesive side 14 of the adhesive sheet 10, which is located opposite the bonding side 12, is adapted to be removably attached to the support surface. In one embodiment, the adhesive sheet 10 may be used as a stand-alone product. That is, the adhesive sheet 10 may be applied to the support surface by itself such that the item may be subsequently attached to the adhesive sheet 10, as will be discussed in greater detail below. In another embodiment, the item may be pre-laminated to the bonding side 12 of the adhesive sheet 10 and then applied to the support surface as a single unit. The construction and use of the adhesive sheet 10 are discussed in greater detail below.

The adhesive sheet 10 includes an elastic and/or flexible layer 16 having a plurality of holes 18 (see FIG. 2) provided throughout the elastic layer 16. In one embodiment, the elastic layer 16 is made from a foam material composed of ethylene vinyl acetate (EVA), which is a copolymer of ethylene and vinyl acetate. In other embodiments, the foam can be made from any suitable elastic material, such as rubber, plastic, urethane, polyurethane (PU), polyethylene (PE), polystyrene, vinyl, silicone, latex rubber, etc., or mixtures thereof.

In one embodiment, the elastic layer 16 may be formed from a mixture of EVA (e.g., in about 25%-35% by weight), PE (e.g., in about 25%-35% by weight) and/or PU (e.g., in about 5%-10% by weight). This mixture may optionally include other components, such as a filler (e.g., calcium carbonate and/or talcum powder) in about 20%-30% by weight, a foaming agent (e.g., azodicarbonamide), a cross-linking agent (e.g., dicumyl peroxide), a foaming promoter (e.g., zinc oxide) and/or a lubricating agent (e.g., stearic acid). In one embodiment, the mixture is chemically blended by heat and pressure in a mixer using at a suitable temperature and pressure to create a paste-like substrate. The paste-like substrate is then fed through an extruder and conveyor to form a substantially flat sheet of the blended material. Thereafter, the flat sheet is subjected to a foaming process by feeding same into a mold foaming vulcanizing machine at a suitable temperature and pressure. The flat sheet undergoes a vulcanization process to form a foamed sheet with a desired density, thickness, etc.

In one embodiment, the elastic layer 16 of the present invention provides a rubber foam-like in softness and flexibility. The material has low-temperature toughness, stress-crack resistance, waterproof properties, resistance to UV radiation, foam recovery from compression.

Figure 3:
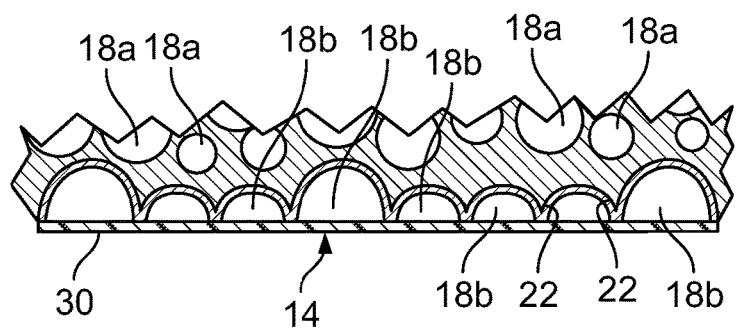
FIG. 3 is an enlarged view of a portion of the adhesive sheet shown in FIG. 2.

In one embodiment, the holes 18 are distributed randomly and substantially throughout the entire elastic layer 16. In another embodiment, the holes 18 can be distributed substantially uniformly in the elastic layer 16. In one embodiment, the holes 18 positioned in the interior of the adhesive sheet 10 (see, e.g., the holes labeled as "18a" in FIG. 3) are formed as closed cells such that air or other gas is encapsulated or trapped in the holes 18a. On the other hand, the holes positioned on the surfaces of the bonding and adhesive sides 12, 14 of the elastic layer 16 (see, e.g., the holes labeled as "18b" in FIG. 3) are open to the exterior of the elastic layer 16. In one embodiment, the holes 18b positioned on the adhesive side 14 of the elastic layer 16 each have a concave shape extending inwardly into the elastic layer 16 and are treated as discussed below such that they can provide and maintain suction against the support surface for releasably attaching the adhesive sheet 10 to same. In one embodiment, the holes 18b are spread substantially throughout the entire surface of the adhesive side 14 of the elastic layer 16.

In one embodiment, the holes 18 have random sizes. In one embodiment, at least some or substantially all of the holes 18 have a diameter greater than approximately 10 µm. In another embodiment, at least some or substantially all of the holes 18 have a diameter greater than approximately 20 µm. In another embodiment, at least some or substantially all of the holes 18 have a diameter greater than approximately 30 µm. In another embodiment, at least some or substantially all of the holes 18 have a diameter greater than approximately 40 µm. In another embodiment, at least some or substantially all of the holes 18 have a diameter greater than approximately 50 µm. In another embodiment, at least some or substantially all of the holes 18 have a diameter greater than approximately 60 µm. In another embodiment, at least some or substantially all of the holes 18 have a diameter greater than approximately 70 µm. In another embodiment, at least some or substantially all of the holes 18 have a diameter greater than approximately 80 µm. In another embodiment, at least some or substantially all of the holes 18 have a diameter greater than approximately 90 µm. In another embodiment, at least some or substantially all of the holes 18 have a diameter greater than approximately 100 μm.

In one embodiment, at least some or substantially all of the holes 18 have a diameter less than approximately 1 mm. In another embodiment, at least some or substantially all of the holes 18 have a diameter less than approximately 900 μm. In another embodiment, at least some or substantially all of the holes 18 have a diameter less than approximately 800 μm. In another embodiment, at least some or substantially all of the holes 18 have a diameter less than approximately 700 μm. In another embodiment, at least some or substantially all of the holes 18 have a diameter less than approximately 600 μm. In another embodiment, at least some or substantially all of the holes 18 have a diameter less than approximately 500 μm. In another embodiment, at least some or substantially all of the holes 18 have a diameter less than approximately 400 μm. In another embodiment, at least some or substantially all of the holes 18 have a diameter less than approximately 300 μm. In another embodiment, at least some or substantially all of the holes 18 have a diameter less than approximately 200 μm. In another embodiment, at least some or substantially all of the holes 18 have a diameter less than approximately 100 μm.

In one embodiment, at least some or substantially all of the holes 18 have a diameter ranging from approximately 10 μm to approximately 250 μm. In another embodiment, at least some or substantially all of the holes 18 have a diameter ranging from approximately 20 μm to approximately 240 μm. In another embodiment, at least some or substantially all of the holes 18 have a diameter ranging from approximately 30 μm to approximately 230 μm. In another embodiment, at least some or substantially all of the holes 18 have a diameter ranging from approximately 40 μm to approximately 220 μm. In another embodiment, at least some or substantially all of the holes 18 have a diameter ranging from approximately 50 μm to approximately 210 μm. In another embodiment, at least some or substantially all of the holes 18 have a diameter ranging from approximately 60 μm to approximately 200 μm. In another embodiment, at least some or substantially all of the holes 18 have a diameter ranging from approximately 70 μm to approximately 190 μm. In another embodiment, at least some or substantially all of the holes 18 have a diameter ranging from approximately 75 μm to approximately 180 μm. In another embodiment, at least some or substantially all of the holes 18 have a diameter ranging from approximately 75 μm to approximately 170 μm. In another embodiment, at least some or substantially all of the holes 18 have a diameter ranging from approximately 75 μm to approximately 160 μm.

The elastic layer 16 can have a varying density, depending on various factors and variables, such as the number and size of the holes 18. In one embodiment, the density of the elastic layer 16 ranges from about 30 kg/m$^3$ to about 280 kg/m$^3$. In other embodiments, the density of the elastic layer 16 can be less than about 30 kg/m$^3$ or greater than about 280 kg/m$^3$.

The elastic layer 16 can also have a thickness that can vary depending on various factors, such as types of item for attachment to the adhesive sheet 10. In one embodiment, the elastic layer 16 ranges in thickness from about 0.1 mm to about 5 mm. In other embodiments, the thickness of the elastic layer 16 can be greater than about 5 mm or smaller than about 0.1 mm. In another embodiment, the thickness of the elastic layer 16 is greater than the largest diameter or radius of the holes 18 so as to ensure that the interior surfaces of the holes 18b provided on the adhesive side 14 of the elastic layer 16 are completely closed or sealed.

In one embodiment, a coating of sealing material 20 is applied to the outer surface of the elastic layer 16 on the adhesive side 14 of the adhesive sheet 10. The sealing material can be any suitable sealing material capable of providing a substantially air-tight seal to the interior surfaces of the holes 18b and/or around edges or lips 22 (see FIG. 3) surrounding the holes 18b. In this manner, the holes 18b are adapted to function as micro-suction holes for releasably attaching the adhesive sheet 10 to a non-porous, substantially flat surface. In one embodiment, the sealing material includes polyurethane ("PU").

In one embodiment, the adhesive sheet 10 also includes a primer coating 24 applied to the outer surface of the elastic layer 16 on the bonding side 12 of the adhesive sheet 10. More particularly, the primer coating 24 can be any suitable material known to persons of ordinary skill in the art. A layer of bonding material 26 is also applied to the primer coating 24. The bond layer 26 can be any suitable material known to persons of ordinary skill in the art for securely or fixedly bonding the adhesive sheet 10 to another item. Optionally, protective films 28, 30 (e.g., peel-off paper liners) are applied over the bonding layer 26 and the sealing coating 20, respectively, to protect same during storage and/or transportation.

Figure 5:
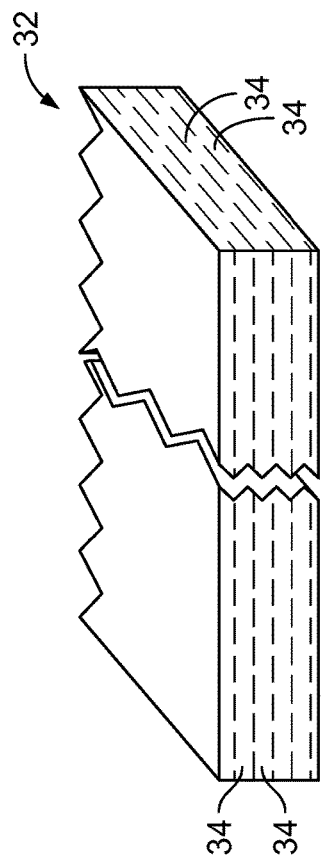
FIG. 5 is a foam layer used for making an adhesive sheet in accordance with an embodiment of the present invention.
Figure 7A:
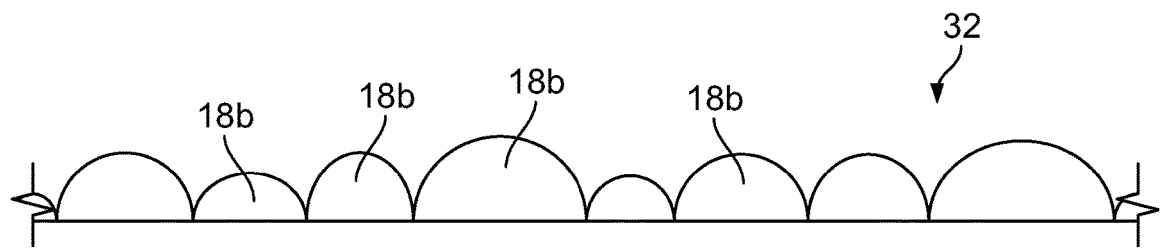
FIGS. 7A and 7B are schematic diagrams of holes formed in one side of a foam sheet during the process illustrated in FIG. 6.

In one embodiment, a method is provided for making the adhesive sheet 10. The adhesive sheet 10 can be made from a foam 32 (see FIG. 5), such as an EVA foam, which is made in a manner known in the art. In one embodiment, the foam 32 may be purchased from a foam manufacturer, such as Foamtech LTD, located Shanghai City, China. The foam 32 is then cut into a plurality of sheets 34 in desired thicknesses, as indicated by dotted-line representation in FIG. 5. The sheets 34 are then attached (e.g., glued) to each other in an end-to-end fashion so as to create a substantially continuous foam sheet rolled into a roll for easy storage and/or transportation. At this stage, the sheet 34 has a construction similar or corresponding to that of the elastic layer 16 shown in FIGS. 2 and 3. That is, the sheet 34 has a plurality of open holes 18b formed on each outer side or surface thereof (see FIG. 7A). The sealing layer 20, the primer coating 24 and the bonding layer 26 are applied to the sheet 34 in the following manner.

Figure 6:
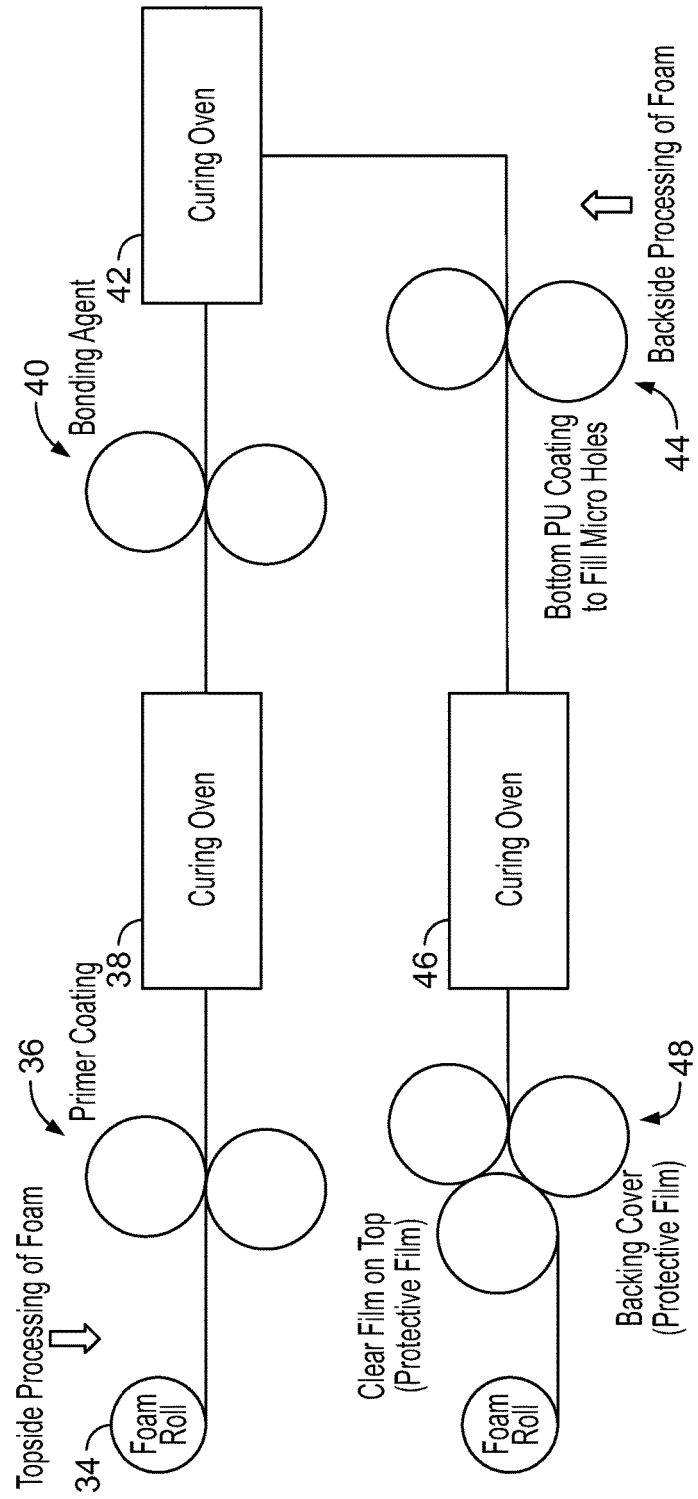
FIG. 6 is a schematic diagram illustrating a process for making an adhesive sheet in accordance with an embodiment of the present invention.
Figure 7B:
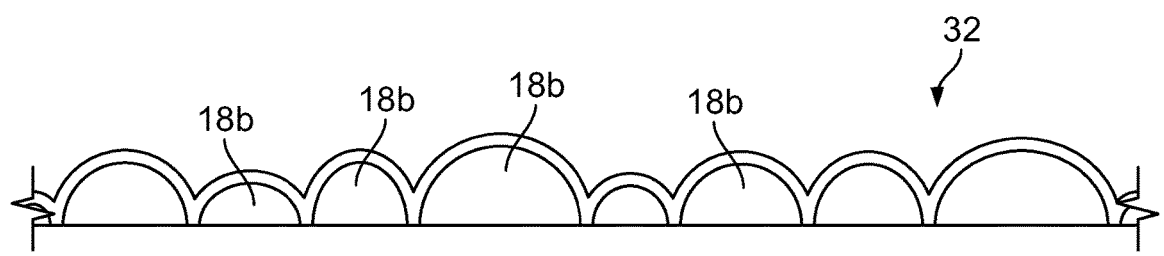

With reference to FIG. 6, the rolled foam sheet 34 is fed to a first roller applicator 36, which applies a primer coating 24 to one side of the sheet 34. The sheet 34 then passes through a first oven 38 so as to cure the primer coating 24 at a suitable temperature (e.g., at 100° C.). Thereafter, the sheet 34 is fed to a second roller applicator 40, which applies a bonding agent over the cured primer coating 24, and then passes through a second oven 42 to cure the bonding agent to form a bonding layer 26 over the primer coating 24. A third roller applicator 44 applies a coating 20 of sealing material (e.g., PU) in liquid form to the opposite side of the sheet 34 (see also FIG. 7B), while a third oven 46 cures the sealing coating 20, which has been applied to the sheet 34, at a suitable temperature (e.g., at 165° C.–170° C.). Thereafter, protective films 28, 30 are sequentially applied to the bonding layer 26 and the sealing coating 20, respectively, via one or more applicators 48. The processed sheet 34 is then formed into a roll for storage, transportation and/or further processing.

Figure 4A:
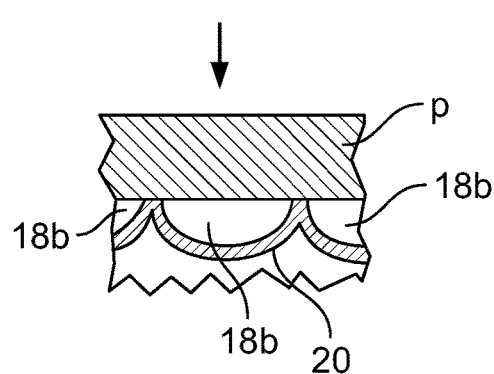
FIGS. 4A and 4B are schematic diagrams of suction holes provided in an adhesive side of the adhesive sheet shown in FIGS. 2 and 3.
Figure 4B:
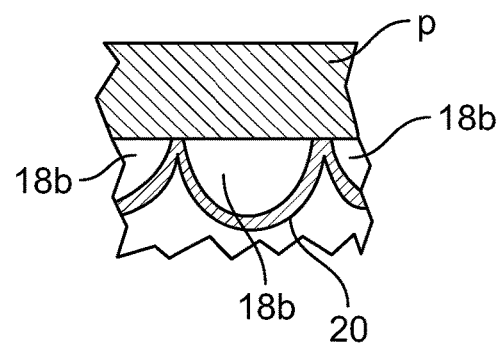

In one embodiment, the adhesive sheet 10 may be used for attaching one or more flooring or wall panels P (see FIG. 4A) to a support surface, such as a floor, a sub-floor or a wall (not shown in FIG. 4A). The adhesive layer 10 may be used as a stand-alone underlayment layer. With the protective film 28 removed, the bonding layer 26 is applied to the support surface (e.g., a sub-floor or a wall) so as to securely and fixedly attach the adhesive sheet 10 to the support surface. The protective film 30 is then removed from the adhesive sheet 10, exposing the suction holes 18b in the adhesive side 14 of the adhesive layer 16. The flooring/wall panel P is then attached to the adhesive sheet 10 via the suction holes 18b to secure same to the support surface. Sufficient pressure (as indicated by the arrow in FIG. 4A) is applied manually and/or with the use of a tool over the flooring/wall panel P, at least partially compressing the holes 18b. When the applied pressure is released, the holes 18b return to their original shapes (see FIG. 4B), creating negative pressure or partial vacuum therewithin and releasably attaching the flooring/wall panel P to the adhesive sheet 10 and hence the support surface. The negative pressure is maintained within the holes 18b by the sealing layer 20, which creates a substantially air-tight seal between the holes 18b and the bottom surface of the flooring/wall panel P. The flooring/wall panel P may be detached from the adhesive sheet 10 and hence the support surface by peeling same away from the adhesive sheet 10 and releasing the negative pressure created by the suction holes 18b. Once the flooring/wall panel P is removed, another flooring/wall panel of a different design, pattern and/or type may be installed on the adhesive layer 10. Multiple adhesive layers 10 may be installed as an underlayment layer so as to allow a user to easily and readily change the look and/or feel of his/her floor.

In one embodiment, the flooring/wall panel P may be any flooring or wall panel having a substantially non-porous bottom, such as luxury vinyl tiles ("LVT"), carpet tiles, hard wood or engineered wood panels, laminates, rubber tiles, vinyl composition tiles, decorative wall panels, wood plastic composites, rigid vinyl, sheet vinyl, multilayer flooring, stones/tiles, carpet rolls, non-polyvinyl chloride (PVC) tiles and planks, etc. In other embodiments, any item, such as other construction or decorative products, may be used in conjunction with the adhesive sheet 10 for removably attaching same to a suitable support surface.

Figure 8:
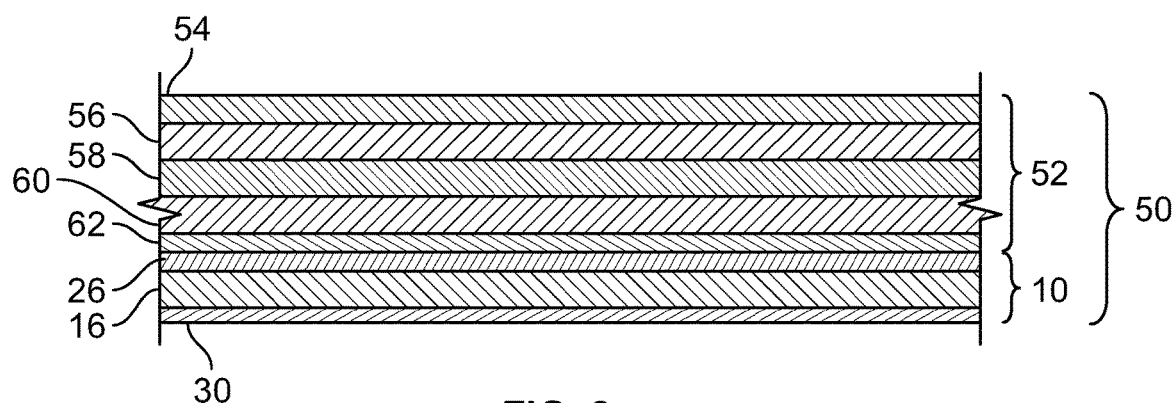
FIG. 8 is a cross-sectional, schematic view of a composite flooring panel in accordance with an embodiment of the present invention.

In one embodiment, the adhesive sheet 10 is pre-laminated to a prefabricated flooring plate 52 to form a composite flooring panel 50 adapted to be releasably attached to a non-porous sub-floor or over an existing floor (see FIG. 8, in which only certain components of the adhesive sheet 10 are shown). The flooring plate 52 has a construction similar to that of a conventional flooring panel. If a conventional LVT is used for constructing the flooring panel 50, the flooring plate 52 may be provided with a top polyurethane layer 54, a wear layer 56 below the polyurethane layer 54, a pattern layer 58 below the wear layer 56, a stabilization layer 60 below the pattern layer 58, and a load bearing layer 62 below the stabilization layer 60. As will be readily apparent to a person skilled in the art, one or more layers 54, 56, 58, 60, 62 may be eliminated, or one or more additional layers may be added.

The flooring plate 52 is pre-laminated to the bonding layer 26 of the adhesive sheet 10. Accordingly, the protective film 28 is not present in the flooring panel 50. In one embodiment, the protective film 30 is present in the flooring panel 50, to safeguard the adhesive side 14 of the adhesive sheet 10.

Figure 9:
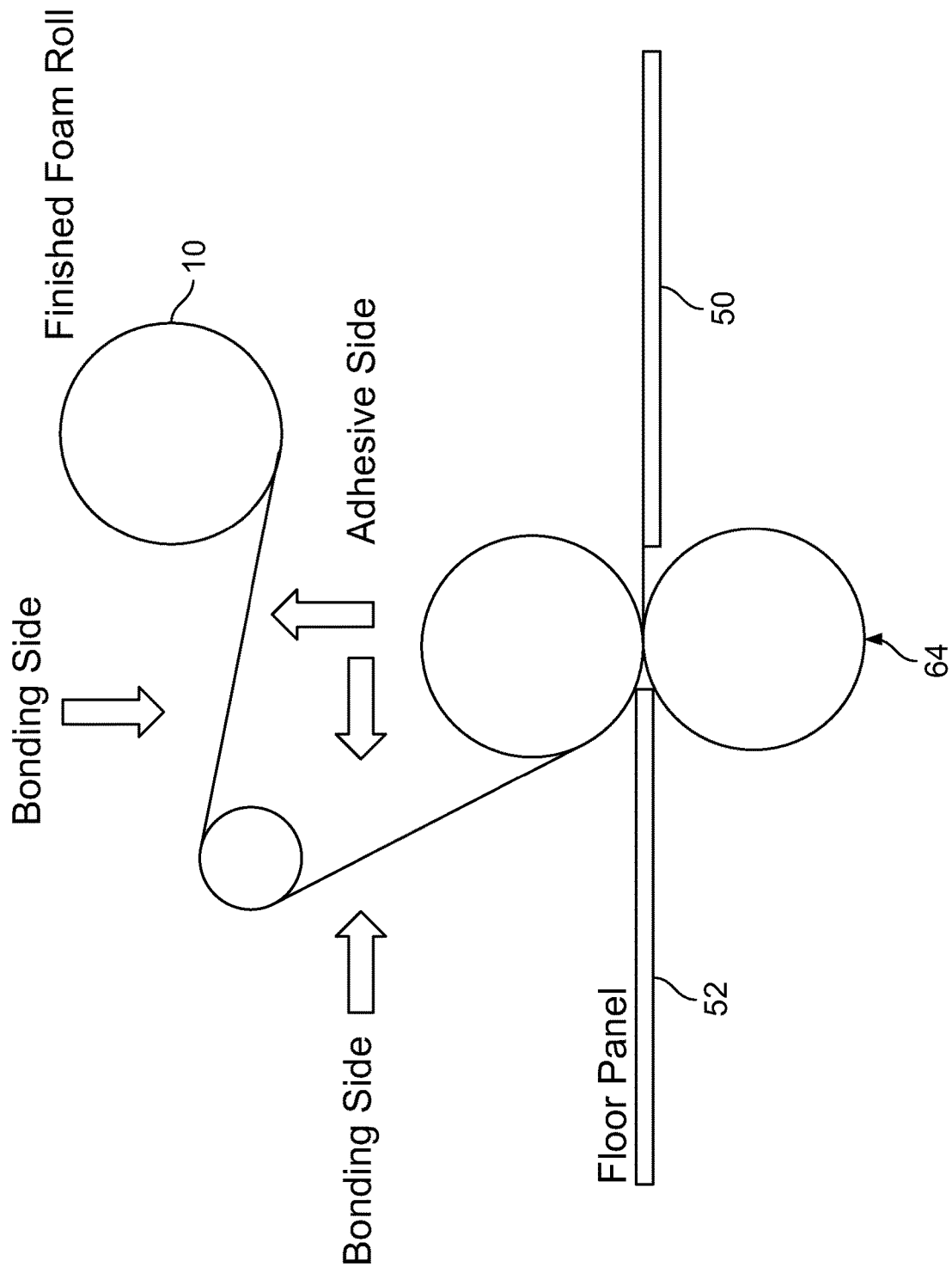
FIG. 9 is a schematic diagram illustrating a process for making a composite flooring panel in accordance with an embodiment of the present invention.

In one embodiment, a method for making the flooring panel 50 is provided. With reference to FIG. 9, the rolled foam sheet 34 resulting from the process discussed above and illustrated in conjunction with FIG. 6 is unrolled and fed to a roller mechanism 64 together with a prefabricated flooring plate 52. The prefabricated flooring plate 52 and the adhesive sheet 10 are pressed against one another such that the flooring plate 52 is fixedly bonded to the bonding layer 26 of the adhesive sheet 10. In one embodiment, the roller mechanism 64 includes power rolls, such as nip rolls and pinch rolls, that apply high pressure to, and thereby press, two or more sheets into intimate contact for squeezing out bubbles or blisters that may cause a defective bonding.

It will be understood that the embodiments described herein are merely exemplary and that a person skilled in the art may make many variations and modifications without departing from the spirit and scope of the invention. All such variations and modifications are intended to be included within the scope of the invention.

We claim:

1. A flooring panel comprising an upper floor layer having an upper side and a lower side; and an adhesive layer including an elastic layer having an upper side, which is attached to said lower side of said upper floor layer, and a lower side, which is located opposite said upper side of said elastic layer and which defines a lower surface of said elastic layer, said adhesive layer including a sealing material having been applied as a liquid to substantially the entire surface of said lower side of said elastic layer, and then cured, so to provide said adhesive layer with a self-adhesive property, said elastic layer being made from a foam material including a closed-cell structure having a plurality of isolated cavities, and including a plurality of open holes formed in said lower side of said elastic layer, each of said holes having a concave shape that extends inwardly into the elastic layer while being isolated from the plurality of isolated cavities and having an interior surface and a lower edge, which are formed as part of said foam material, said sealing material having been applied as the liquid prior to curing to enable coating the interior surfaces and said lower edges of at least some of said holes while maintaining hollow spaces within said at least some of said holes, said sealing material configured and arranged to provide a substantially air-tight seal to said interior surfaces and said lower edges of said at least some of said holes such that when said adhesive layer is applied to a support surface, said at least some of said holes are configured and arranged to function as micro-suction holes that releasably maintain suction against the support surface so as to releasably attach said flooring panel to the support surface.

2. The flooring panel of claim 1, wherein said sealing material does not completely fill said at least some of said holes so as to maintain said hollow spaces.

3. The flooring panel of claim 1, wherein said sealing material includes polyurethane.

4. The flooring panel of claim 1, wherein said holes are randomly distributed throughout the entire surface of said lower side of said elastic layer.

5. The flooring panel of claim 1, wherein said holes have random sizes.

6. The flooring panel of claim 1, wherein said foam material is made from a composition including ethylene vinyl acetate, rubber, plastic, urethane, polyurethane, polyethylene, polystyrene, vinyl, silicone, latex rubber or a mixture thereof.

7. The flooring panel of claim 6, wherein said composition includes a mixture having ethylene vinyl acetate, polyethylene and/or polyurethane.

8. The flooring panel of claim 7, wherein said mixture includes ethylene vinyl acetate in about 25%-35% by weight, polyethylene in about 25%-35% by weight and polyurethane in about 5%-10% by weight.

9. The flooring panel of claim 8, wherein said mixture further includes at least one of a filler, a foaming agent, a crosslinking agent, a foaming promoter, and a lubricating agent.

10. The flooring panel of claim 1, further comprising a bonding layer coupled between said upper floor layer and said elastic layer, the bonding layer configured for fixedly attaching said upper floor layer to said elastic layer.

11. The flooring panel of claim 10, further comprising a protective layer removably attached to said lower side of said elastic layer.

12. The flooring panel of claim 11, wherein said upper floor layer includes at least one of a vinyl tile, a carpet tile, a hard wood panel, an engineered wood panel, a laminate, a rubber tile, a vinyl composition tile, a decorative panel, a wood plastic composite panel, a rigid vinyl tile, a sheet vinyl tile, a multilayer flooring tile, a stone tile, a carpet roll, a non-polyvinyl chloride tile, and a plank.

13. A panel assembly comprising an upper layer having an upper side and a lower side; and an adhesive layer including an elastic layer having an upper side, which is attached to said lower side of said upper layer, and a lower side, which is located opposite said upper side of said elastic layer and which defines a lower surface of said elastic layer, said adhesive layer including a sealing material having been applied as a liquid to substantially the entire surface of said lower side of said elastic layer, and then cured, so to provide said adhesive layer with a self-adhesive property, said elastic layer being made from a foam material including a closed-cell structure having a plurality of isolated cavities, and including a plurality of open holes formed in said lower side of said elastic layer, each of said holes having a concave shape that extends inwardly into the elastic layer while being isolated from the plurality of isolated cavities and having an interior surface and a lower edge, which are formed as part of said foam material, said sealing material having been applied as the liquid prior to curing to enable coating the interior surfaces and said lower edges of at least some of said holes while maintaining hollow spaces within said at least some of said holes, said sealing material providing a substantially air-tight seal to said interior surfaces and said lower edges of said at least some of said holes such that when said adhesive layer is applied to a support surface, said at least some of said holes are configured and arranged to function as micro-suction holes that releasably maintain suction against the support surface so as to releasably attach said panel assembly to the support surface.

14. The panel assembly of claim 13, wherein said upper layer includes a wall panel or a flooring panel.

15. The panel assembly of claim 13, wherein said upper layer includes at least one of a vinyl tile, a carpet tile, a hard wood or engineered wood panel, a laminate, a rubber tile, a vinyl composition tile, a decorative panel, a wood plastic composite, a rigid vinyl tile, a sheet vinyl tile, a multilayer flooring tile, a stone tile, a carpet roll, a non-polyvinyl chloride tile, and a plank.

16. An adhesive layer comprising an elastic layer having an upper side, and a lower side, which is located opposite said upper side of said elastic layer and which defines a lower surface of said elastic layer; and a sealing material having been applied as a liquid to substantially the entire surface of said lower side of said elastic layer, and then cured, so to provide said adhesive layer with a self-adhesive property, said elastic layer being made from a foam material including a closed-cell structure having a plurality of isolated cavities, and including a plurality of open holes formed in said lower side of said elastic layer, each of said holes having a concave shape that extends inwardly into the elastic layer while being isolated from the plurality of isolated cavities and having an interior surface and a lower edge, which are formed as part of said foam material, said sealing material having been applied as the liquid prior to curing to enable coating the interior surfaces and said lower edges of at least some of said holes while maintaining hollow spaces within said at least some of said holes, said sealing material configured and arranged to provide a substantially air-tight seal to said interior surfaces and said lower edges of said at least some of said holes such that when said adhesive layer is applied to a support surface, said at least some of said holes are configured and arranged to function as micro-suction holes that releasably maintain suction against the support surface so as to releasably attach said adhesive layer to the support surface.

17. The adhesive layer of claim 16, further comprising a bonding layer applied to said upper side of said elastic layer, said bonding layer configured for attaching another layer to said upper side of said elastic layer.

\* \* \* \* \*